US009415768B2

(12) United States Patent
Okada et al.

(10) Patent No.: US 9,415,768 B2
(45) Date of Patent: Aug. 16, 2016

(54) CONTROL DEVICE FOR HYBRID VEHICLE

(71) Applicants: Yuruki Okada, Tokyo (JP); Yasuhiko Wada, Tokyo (JP); Hisanori Yamasaki, Tokyo (JP); Keita Hatanaka, Tokyo (JP)

(72) Inventors: Yuruki Okada, Tokyo (JP); Yasuhiko Wada, Tokyo (JP); Hisanori Yamasaki, Tokyo (JP); Keita Hatanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/434,000

(22) PCT Filed: Dec. 14, 2012

(86) PCT No.: PCT/JP2012/082500
§ 371 (c)(1),
(2) Date: Apr. 7, 2015

(87) PCT Pub. No.: WO2014/091619
PCT Pub. Date: Jun. 19, 2014

(65) Prior Publication Data
US 2015/0251648 A1  Sep. 10, 2015

(51) Int. Cl.
B60L 9/00 (2006.01)
H02J 7/00 (2006.01)
(Continued)

(52) U.S. Cl.
CPC .............. B60W 20/106 (2013.01); B60K 6/46 (2013.01); B60L 3/0023 (2013.01); B60L 3/0046 (2013.01); B60L 7/14 (2013.01); B60L 11/123 (2013.01); B60L 11/1861 (2013.01);
(Continued)

(58) Field of Classification Search
USPC ............................................ 701/22; 320/103
See application file for complete search history.

(56) References Cited

U.S. PATENT DOCUMENTS 5,778,326 A  7/1998 Moroto et al.
5,832,396 A  11/1998 Moroto et al.
(Continued)

FOREIGN PATENT DOCUMENTS

EP  1 897 745 A2  3/2008
EP  1 925 494 A2  5/2008
(Continued)

OTHER PUBLICATIONS

International Search Report (PCT/ISA/210) mailed on Feb. 19, 2013 by the Japanese Patent Office as the International Searching Authority for International Application No. PCT/JP2012/082500.
(Continued)

Primary Examiner — Thomas G Black
Assistant Examiner — Tyler Paige
(74) Attorney, Agent, or Firm — Buchanan Ingersoll & Rooney PC

(57) ABSTRACT

A high-order control unit provided in a control device for a hybrid vehicle includes an elevation MAP that is used in common for up and down lines and in which at least two predetermined elevation values on a running track are described, and an energy estimation unit that estimates a target charge/discharge amount SOC_ref with respect to a power storage device on the basis of a traveling direction signal Rev expressing a traveling direction of a vehicle, distance information Dis from a distance translation unit, and information on the elevation MAP, to control a power generation device on the basis of the target charge/discharge amount SOC_ref.

15 Claims, 15 Drawing Sheets

(51) Int. Cl.
| | | |
|---|---|---|
| *B60W 20/00* | (2016.01) | |
| *B60K 6/46* | (2007.10) | |
| *B60W 10/26* | (2006.01) | |
| *B60L 3/00* | (2006.01) | |
| *B60L 7/14* | (2006.01) | |
| *B60L 11/12* | (2006.01) | |
| *B60L 11/18* | (2006.01) | |
| *B60L 15/20* | (2006.01) | |
| *B60W 10/06* | (2006.01) | |
| *B60W 10/08* | (2006.01) | |
| *B60W 10/10* | (2012.01) | |

(52) U.S. Cl.
CPC ........... *B60L 15/2009* (2013.01); *B60W 10/06* (2013.01); *B60W 10/08* (2013.01); *B60W 10/10* (2013.01); *B60W 10/26* (2013.01); *B60W 20/12* (2016.01); *B60W 20/13* (2016.01); *B60L 2200/26* (2013.01); *B60L 2210/30* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2240/70* (2013.01); *B60L 2550/13* (2013.01); *B60W 2710/244* (2013.01); *Y02T 10/6217* (2013.01); *Y02T 10/645* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01); *Y10S 903/93* (2013.01)

(56) References Cited

U.S. PATENT DOCUMENTS

| | | | |
|---|---|---|---|
| 6,166,449 A | | 12/2000 | Takaoka et al. |
| 6,381,522 B1 | | 4/2002 | Watanabe et al. |
| 6,507,127 B1 | | 1/2003 | Amano et al. |
| 7,339,353 B1 | * | 3/2008 | Masias ............... H02J 1/10 320/138 |
| 8,063,609 B2 | * | 11/2011 | Salasoo ............... B60L 3/0046 320/103 |
| 8,290,648 B2 | * | 10/2012 | Yamada ............... B60K 6/442 701/22 |
| 2004/0030471 A1 | | 2/2004 | Faye |
| 2005/0251299 A1 | * | 11/2005 | Donnelly ............... B60L 7/08 701/19 |
| 2009/0044995 A1 | | 2/2009 | Kobayashi |
| 2009/0234521 A1 | * | 9/2009 | Kumar ............... B60L 11/1851 701/19 |
| 2009/0259363 A1 | * | 10/2009 | Li ............... B60K 6/445 701/36 |
| 2010/0019718 A1 | * | 1/2010 | Salasoo ............... B60L 3/0046 320/103 |
| 2011/0246004 A1 | * | 10/2011 | Mineta ............... B60W 20/102 701/22 |
| 2011/0246019 A1 | * | 10/2011 | Mineta ............... B60W 20/00 701/31.4 |
| 2012/0109617 A1 | * | 5/2012 | Minarcin ............ B60L 11/1857 703/14 |
| 2013/0211798 A1 | * | 8/2013 | Maier ............... H01M 8/04992 703/2 |
| 2015/0251648 A1 | * | 9/2015 | Okada ............... B60K 6/46 701/22 |

FOREIGN PATENT DOCUMENTS

| | | |
|---|---|---|
| JP | 08-126116 A | 5/1996 |
| JP | 08-182121 A | 7/1996 |
| JP | 10-150701 A | 6/1998 |
| JP | 2000-232703 A | 8/2000 |
| JP | 2001-095105 A | 4/2001 |
| JP | 2002-199509 A | 7/2002 |
| JP | 2002-354612 A | 12/2002 |
| JP | 2003-235116 A | 8/2003 |
| JP | 2004-521596 A | 7/2004 |
| JP | 2007-049865 A | 2/2007 |
| JP | 2008-067510 A | 3/2008 |
| JP | 2008-131835 A | 6/2008 |
| JP | 2009-11104 A | 1/2009 |
| JP | 2009-254069 A | 10/2009 |
| JP | 4672061 B2 | 4/2011 |
| JP | 4907262 B2 | 3/2012 |
| JP | 2012-106652 A | 6/2012 |
| WO | WO 02/100675 A1 | 12/2002 |

OTHER PUBLICATIONS

Written Opinion (PCT/ISA/237) mailed on Feb. 19, 2013, by the Japanese Patent Office as the International Searching Authority for International Application No. PCT/JP2012/082500.

\* cited by examiner

| | VEHICLE-DIRECTION SWITCHING SIGNAL S | TRAVELING DIRECTION SIGNAL Rev |
|---|---|---|
| OPERATION CONTROL DEVICE 6a | FORWARD/REVERSE | F/R |
| OPERATION CONTROL DEVICE 6b | FORWARD/REVERSE | R/F |

(1) RUNNING TRACK WHEN TRAVELING DIRECTION SIGNAL (Rev) IS F (2) RUNNING TRACK WHEN TRAVELING DIRECTION SIGNAL (Rev) IS R

SAME ELEVATION MAP IS USED REGARDLESS OF F/R

⇩

REDUCTION OF DATA AMOUNT

| | PATENT LITERATURE 1 | PRESENT INVENTION |
|---|---|---|
| USED DATABASE | · OPERATING MODE DATABASE<br>· POSITION-REFERENCE CHARGE AMOUNT DATABASE | · ELEVATION DATABASE |
| NUMBER OF MAP DATA REQUIRED IN ONE TRAIN LINE | TWO PIECES OF DATA | ONE PIECE OF DATA |

CONTROL DEVICE FOR HYBRID VEHICLE

FIELD

The present invention relates to a control device for a hybrid vehicle.

BACKGROUND

A hybrid vehicle is a railroad vehicle configured to convert the output of an engine to electric power by a power generator and to drive an electric motor with the converted power and power from a power storage device such as a battery, thereby executing propulsion control.

With regard to a hybrid vehicle configured in this manner, for example, Patent Literature 1, mentioned below, discloses a technique in which a train control device includes a position measurement unit that measures the position of the vehicle and a position/reference charge amount database that stores therein a reference charge amount pattern of an electric storage device corresponding to the position of the vehicle measured by the position measurement unit, and determines a target amount of charge of the electric storage device (the power storage device) on the basis of the reference charge amount pattern of the electric storage device corresponding to the position of the vehicle measured by the position measurement unit, according to an operating mode database (power running, coasting, braking) set in advance according to the position where the train is running.

CITATION LIST

Patent Literature

Patent Literature 1: Japanese Patent Application Laid-open No. 2008-67510

SUMMARY

Technical Problem

However, it is necessary to store the position/reference charge amount database and the operating mode database corresponding to each of the up and down lines of a running track. Therefore, there is a problem in that the memory capacity in which these databases are stored is occupied.

The present invention has been achieved in view of the above problems, and an object of the present invention is to provide a control device for a hybrid vehicle that can reduce the memory area when controlling the charge and discharge of a power storage device.

Solution to Problem

In order to solve the above problems and achieve the object, the present invention relates to a control device for a hybrid vehicle that is applied to a hybrid vehicle drive system including a power storage device, a power generation device that is electrically connected to the power storage device, and a load device that drives a vehicle by using power from the power storage device and the power generation device, and that comprises a high-order control unit that controls charge and discharge with respect to the power storage device through the power generation device, wherein the high-order control unit includes a height database that is used in common for up and down lines and in which height information on at least two predetermined points on a running track is described, and controls the power generation device by calculating an amount of charge/discharge with respect to the power storage device, on a basis of a traveling direction signal expressing a traveling direction of a vehicle, running distance information obtained by translating the rotation speed information obtained from the speed sensor by the distance translation unit, and information on the height database.

Advantageous Effects of Invention

According to the present invention, an effect is obtained where when controlling the charge and discharge, the amount of information on a database can be reduced by more than that in Patent Literature 1, and the memory capacity in which a vehicle database is stored can be reduced.

DESCRIPTION OF EMBODIMENTS

A control device for a hybrid vehicle according to embodiments of the present invention will be explained below in detail with reference to the accompanying drawings. The present invention is not limited to the embodiments.

First Embodiment

Figure 1:
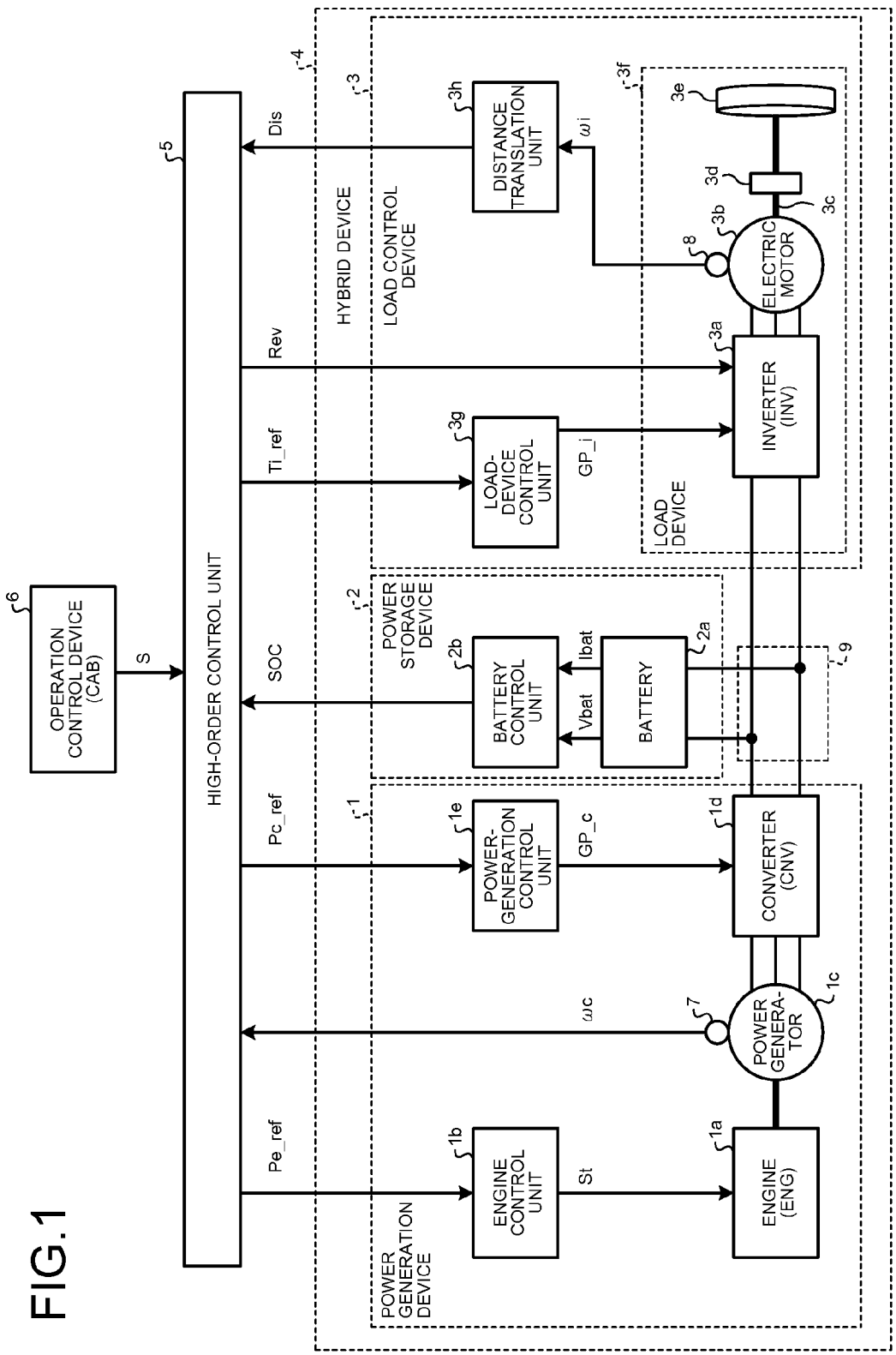
FIG. 1 is a block diagram showing a configuration example of a hybrid vehicle drive system including a control device for a hybrid vehicle according to a first embodiment.

FIG. 1 is a block diagram showing a configuration example of a hybrid vehicle drive system including a control device for a hybrid vehicle (hereinafter, simply "control device") according to a first embodiment of the present invention. In FIG. 1, the hybrid vehicle drive system includes a power generation device 1, a power storage device 2, a load control device 3, and a high-order control unit 5. The power generation device 1, the power storage device 2, and the load control device 3 are connected to a DC link unit 9 for electrically connecting the respective devices, thereby transmitting and receiving power via the DC link unit 9. The power generation device 1, the power storage device 2, and the load control device 3 constitute a hybrid device 4.

The power generation device 1 includes an engine (ENG) 1a, an engine control unit 1b that controls the engine 1a, a power generator 1c driven by the engine 1a, a converter (CNV) 1d that converts AC power generated by the power generator 1c to the desired DC power, and a power-generation control unit 1e that controls the engine 1a and the converter 1d in order to control the power generated by the power generator 1c.

The power storage device 2 includes a battery 2a that can accumulate power and a battery control unit 2b that performs electric power conditioning of the battery 2a.

The load control device 3 includes a load device 3f related to the vehicle drive, a load-device control unit 3g that controls the load device 3f, and a distance translation unit 3h that translates a motor rotation speed ωi from a second speed sensor 8, described later, into distance information Dis.

The load device 3f includes an inverter (INV) 3a that converts DC power supplied via the DC link unit 9 to AC power, an electric motor 3b that drives the vehicle by AC power from the inverter 3a, and a speed reducer 3d connected to the electric motor 3b via an axle 3c to reduce the output of the electric motor 3b and transfer the output to drive wheels 3e.

The high-order control unit 5 is a control unit that executes overall control of the entire hybrid device 4, and controls the engine control unit 1b, the power-generation control unit 1e, the battery control unit 2b, the load-device control unit 3g, and the inverter (INV) 3a in accordance with a vehicle-direction switching signal S from an operation control device (a cab) 6 and the respective sensor outputs from a first speed sensor 7 and the second speed sensor 8. It is obvious that the functions of the engine control unit 1b and the power-generation control unit 1e, which are control units of the power generation device 1, the battery control unit 2b, which is a control unit of the power storage device 2, and the load-device control unit 3g, which is a control unit of the load control device 3, can be added to the high-order control unit 5.

The respective units constituting the control device are explained below in detail.

The engine 1a is, for example, a diesel engine and transmits a drive force for power generation to the power generator 1c. The engine 1a can operate, during a regeneration (braking) operation of the electric motor 3b, an engine brake or what is called an "exhaust brake" (an assisted engine brake), by which the exhaust pressure is increased by closing a valve provided somewhere along the exhaust pipe to increase the pumping loss of the engine 1a, thereby suppressing the rotation speed. The engine 1a can also perform switching between the engine brake and the exhaust brake by executing ON/OFF control of an exhaust valve. These types of control can be executed by outputting a valve operating signal (not shown) to the engine 1a from the power-generation control unit 1e, for example, in the configuration shown in FIG. 1.

The power generator 1c is, for example, a three-phase AC power generator and functions as a power supply source that rotates the rotor by the drive force of the engine 1a to generate power and supplies the generated power (AC power) to the DC link unit 9. The power generator 1c can also operate as an electric motor, and can consume power by cranking the engine 1a when starting the engine 1a or by rotating the engine 1a by using the drive force of the power generator 1c.

The converter 1d is configured to include a plurality of switching elements and diode elements (not shown). The converter 1d is connected between the DC link unit 9, to which both the battery 2a and the inverter 3a are electrically connected, and the power generator 1c, in order to convert AC power generated by the power generator 1c to DC power in accordance with a gate signal Gp_c from the power-generation control unit 1e. When the power generator 1c is operating as an electric motor, the converter 1d performs a reverse conversion operation to convert DC power supplied from the battery 2a or the inverter 3a to the DC link unit 9 to AC power.

The inverter 3a is configured to include a plurality of switching elements and diode elements (not shown), and the inverter 3a converts DC power supplied to the DC link unit 9 from at least one of the battery 2a and the converter 1d to AC power and supplies AC power to the electric motor 3b. When the electric motor 3b is caused to perform a regeneration operation, the inverter 3a can perform the reverse conversion operation for converting AC power regenerated by the electric motor 3b to DC power. The electric motor 3b is, for example, a three-phase AC electric motor and generates the drive force and transmits the drive force to the drive wheels 3e via the speed reducer 3d. The electric motor 3b can be operated as a power generator, and when the vehicle is decelerating, the electric motor 3b is driven by the drive wheels 3e in order to generate regenerative power, thereby performing an operation to regenerate kinetic energy of the vehicle.

The battery 2a is, for example, a lithium-ion secondary battery. The battery 2a is charged by the output power from the power generator 1c or regenerative power from the electric motor 3b supplied via the DC link unit 9, and supplies drive power for driving the power generator 1c and the electric motor 3b to the DC link unit 9.

The engine control unit 1b adjusts a throttle opening degree St of the engine 1a on the basis of an engine-output command value Pe_ref output from the high-order control unit 5 and a signal of the rotation speed or the like of the engine detected by a sensor (not shown) provided in the engine 1a, and controls the speed of the engine 1a such that the engine 1a generates a shaft output corresponding to the engine-output command value Pe_ref.

The power-generation control unit 1e generates the gate signal Gp_c for switching control of the switching elements constituting the converter 1d corresponding to a generated-power command value Pc_ref output from the high-order control unit 5, to control a voltage to be supplied from the converter 1d to the power generator 1c.

The battery control unit 2b estimates a state of charge SOC of the battery 2a on the basis of a battery current value Ibat as a charge current or a discharge current of the battery 2a detected by a current sensor (not shown) of the battery 2a and a battery voltage value Vbat detected by a voltage sensor (not shown) of the battery 2a, and outputs the estimated state of charge SOC to the high-order control unit 5. The battery current value Ibat and the battery voltage value Vbat can be detected by providing the current sensor and the voltage sensor in the DC link unit 9 and detection values thereof can be input to the battery control unit 2b.

The load-device control unit 3g generates a gate signal GP_i, which is a switching signal to be used when performing what is called "PWM (Pulse Width Modulation) control" for controlling the inverter 3a such that the torque of the electric motor 3b follows a motor-torque command value Ti_ref output from the high-order control unit 5, and outputs the generated gate signal GP_i to the load device 3f in order to control the inverter 3a.

The high-order control unit 5 has a function of managing the entire operation of the respective constituent elements described above. Specifically, the high-order control unit 5 controls the power generator 1c via the power-generation control unit 1e and the converter 1d on the basis of a power-generator rotation speed ωc of the power generator 1c, the distance information Dis translated by the distance translation unit 3h, the vehicle-direction switching signal S, and the state of charge SOC, and controls the engine 1a via the engine control unit 1b.

In the device configuration described above, when the vehicle on which the high-order control unit 5 is mounted runs on a track, the vehicle can be controlled by using an elevation MAP, which will be described later, without using a position/reference charge amount database or an operating mode database corresponding to each of the up and down lines as described in Patent Literature 1.

Figure 2:
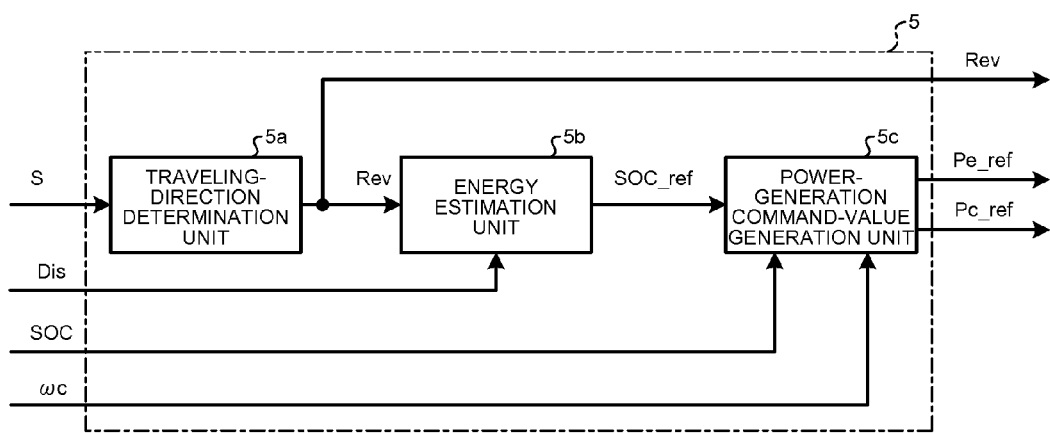
FIG. 2 is a block diagram showing a configuration of a high-order control unit constituting relevant parts of the control device according to the first embodiment.

FIG. 2 is a block diagram showing a configuration example of the high-order control unit 5 constituting relevant parts of the control device according to the first embodiment. In FIG. 2, the high-order control unit 5 includes a traveling-direction determination unit 5a, an energy estimation unit 5b, and a power-generation command-value generation unit 5c. The traveling-direction determination unit 5a generates a traveling direction signal Rev from a "forward" or "reverse" signal in the vehicle-direction switching signal S, and transmits the traveling direction signal Rev to the energy estimation unit 5b and the inverter 3a (see FIG. 1). The energy estimation unit 5b estimates a target charge/discharge amount SOC_ref until the target point is reached on the basis of the traveling direction signal Rev from the traveling-direction determination unit 5a and the distance information Dis translated by the distance translation unit 3h. The power-generation command-value generation unit 5c determines the engine-output command value Pe_ref and the generated-power command value Pc_ref on the basis of the target charge/discharge amount SOC_ref, the state of charge SOC, and the power-generator rotation speed ωc.

Figures 3, 4:
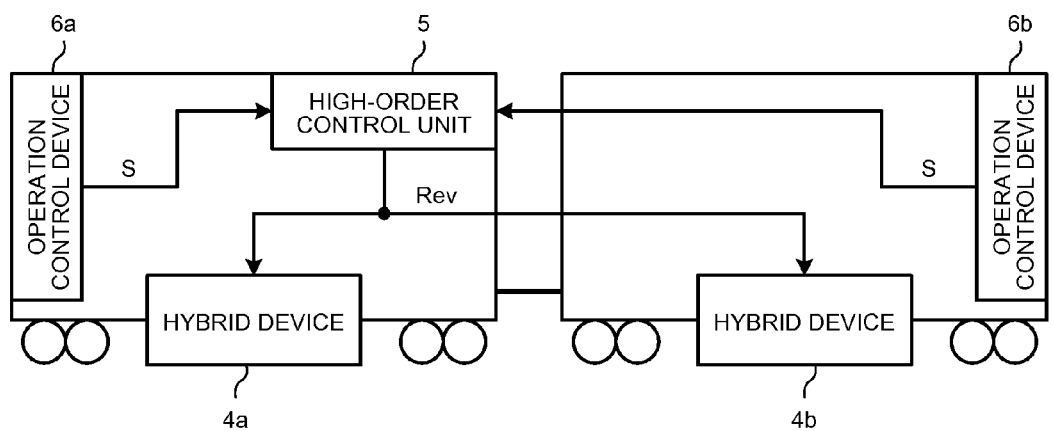
FIG. 3 is a diagram showing a configuration example when the control device for a hybrid vehicle according to the first embodiment is mounted on a vehicle.
FIG. 4 is a diagram in which details of an internal process of a traveling-direction determination unit are summarized in a table format.

FIG. 3 is a diagram showing a configuration example when the control device according to the first embodiment is mounted on a vehicle. In FIG. 3, a case of a two-car formation is shown as an example; however, the number of cars is only an example, and the railroad vehicle can be in a one-car formation or a three-car formation or more. For example, as shown in FIG. 3, in the case of a two-car formation, the railroad vehicle has a configuration including two operation control devices, one high-order control unit 5, and two hybrid devices.

In FIG. 3, the high-order control unit 5 outputs the traveling direction signal Rev to the hybrid devices (4a and 4b) under the floor of the vehicle in accordance with the vehicle-direction switching signal S from the operation control device 6. Two operation control devices 6 (6a and 6b) are mounted on the railroad vehicle as shown in FIG. 3, and when any of the drivers (not shown) outputs the vehicle-direction switching signal S, the vehicle-direction switching signal S is transmitted to the high-order control unit 5.

As described above, the vehicle-direction switching signal S is a signal for determining whether to move the vehicle "forward" or "reverse". That is, a driver who is aboard any of the vehicles confirms in which direction of the upbound and downbound directions (up or down) of the track the vehicle is to run, and outputs the vehicle-direction switching signal S indicating "forward" or "reverse" to the high-order control unit 5. The high-order control unit 5 having received the transmitted vehicle-direction switching signal S converts the vehicle-direction switching signal S to the traveling direction signal Rev by the traveling-direction determination unit 5a (see FIG. 2), and transmits the traveling direction signal Rev to the hybrid devices 4a and 4b (see FIG. 3) and the energy estimation unit 5b (see FIG. 2) in the vehicle. The high-order control unit 5 causes the hybrid devices 4a and 4b to recognize in which direction of "forward" and "reverse" the vehicle is running.

FIG. 4 is a diagram in which details of an internal process of the traveling-direction determination unit 5a shown in FIG. 2 are summarized in a table format. Specifically, if the operation control device 6a in FIG. 3 outputs a "forward" signal as the vehicle-direction switching signal S, the high-order control unit 5 outputs a signal indicating that the traveling direction signal Rev is "F" (forward) to the hybrid devices 4a and 4b. If the operation control device 6a outputs a "reverse" signal as the vehicle-direction switching signal S, the high-order control unit 5 outputs a signal indicating that the traveling direction signal Rev is "R" (reverse) to the hybrid devices 4a and 4b.

In contrast, when the vehicle-direction switching signal S is output from the operation control device 6b, the relation described above is reversed. That is, if the operation control device 6b outputs the "forward" signal as the vehicle-direction switching signal S, the high-order control unit 5 outputs a signal indicating that the traveling direction signal Rev is "R" (reverse) to the hybrid devices 4a and 4b. If the operation control device 6b outputs a "reverse" signal as the vehicle-direction switching signal S, the high-order control unit 5 outputs a signal indicating that the traveling direction signal Rev is "F" (forward) to the hybrid devices 4a and 4b.

The traveling direction signal Rev is information required when determining a start point and a target point when an elevation MAP 5b1 described later is referred to and switching between the start point and the target point according to the traveling direction. Therefore, even in a state where the traveling direction is not changed, it is preferable to maintain the state of the traveling direction signal Rev every time the vehicle reaches the target point. If the target charge/discharge amount SOC_ref is calculated when the traveling direction signal Rev is input, the charge/discharge control with respect to the power storage device 2 can be executed at a preferable timing.

Figure 5:
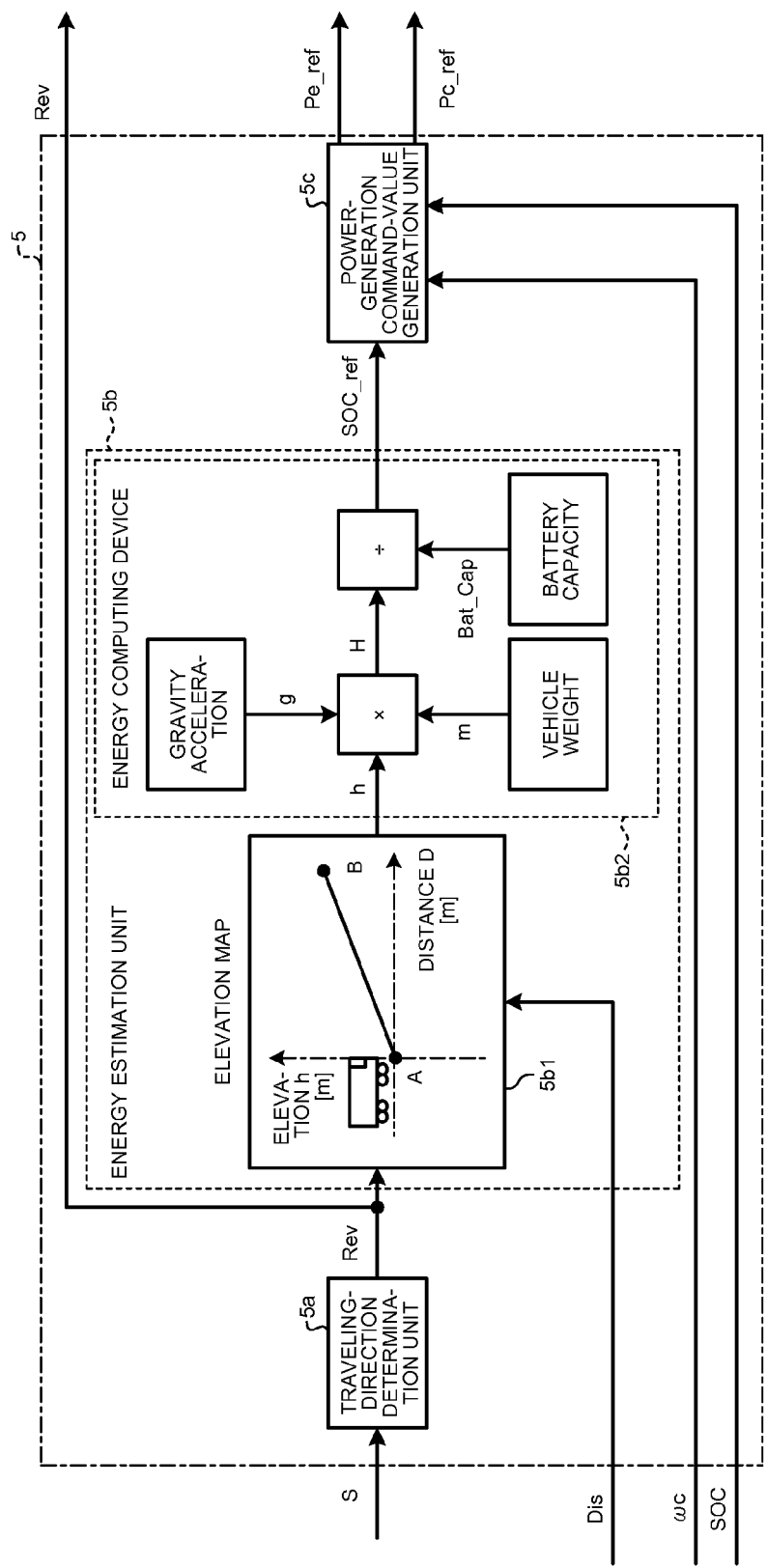
FIG. 5 is a block diagram showing a configuration of the high-order control unit in more detail.

FIG. 5 is a block diagram showing a configuration of the high-order control unit 5 shown in FIG. 2 in more detail. As shown in FIG. 5, the energy estimation unit 5b is configured to include the elevation MAP 5b1 and an energy computing device 5b2. The elevation MAP 5b1 having a function of an elevation (height) database designates the current elevation as the start point to obtain an elevation h of the target point on the basis of the distance information Dis translated by the distance translation unit 3h. The energy computing device 5b2 estimates the target charge/discharge amount SOC_ref until the target point described above is reached by using the elevation h at the target point. The elevation MAP 5b1 and detailed operations of the energy computing device 5b2 are explained with reference to FIG. 6.

Figure 6:
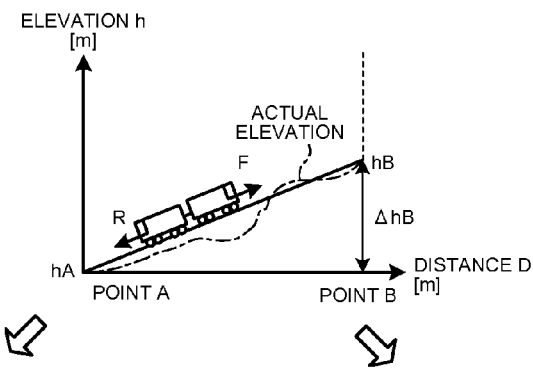
FIG. 6 is an image diagram explaining the concept of an elevation MAP.
Figure 6:
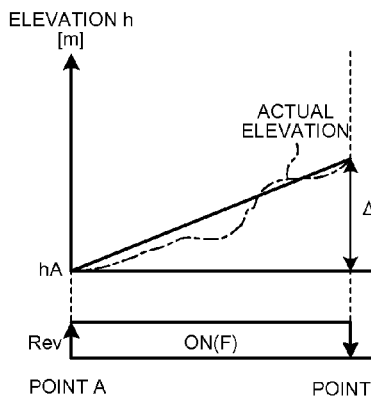
Figure 6:
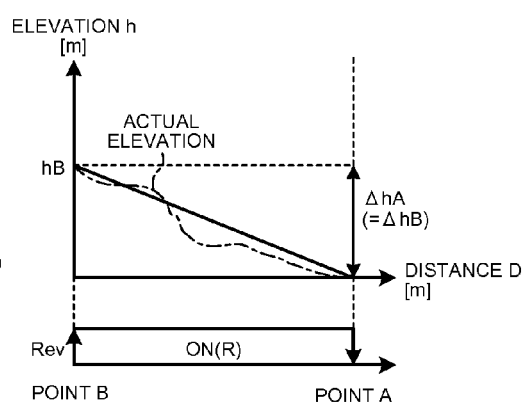

FIG. 6 is an image diagram explaining the concept of the elevation MAP 5b1, and elevations h (vertical axis) at respective points when a point A is designated as the start point and a point B is designated as the target point are shown in relationship to distance D (horizontal axis) between the point A and the point B. Furthermore, a case when the traveling direction signal Rev is "F" or "R" with respect to the distance D (horizontal axis) is designated as an "ON" state, and the rise and fall of the traveling direction signal Rev are shown together. It is assumed that the elevation at the point A is hA and the elevation at the point B is hB(=hA+ΔhB), and elevation information at the respective points is stored in the elevation MAP 5b1. In FIG. 6, the actual elevation is as shown by a dotted line. However, in the present embodiment, a simple elevation MAP 5b1 is used that can be determined if pieces of information on two points, i.e., the start point and the target point, are known, such that the point A (the elevation hA) and the point B (the elevation hB) are connected by a straight line and shown by a solid line.

A running track is explained with reference to the elevation MAP 5b1 in FIG. 6 as an example. A case where the traveling direction signal Rev is determined as "F" and the vehicle runs from the point A to the point B is considered here. In this case, because the elevation hA is lower than the elevation hB, it is determined that the vehicle is running uphill (see the lower left diagram (1) in FIG. 6). In contrast, a case where the traveling direction signal Rev is determined as "R" and the vehicle runs from the point B to the point A is considered. In this case, because the elevation hA is lower than the elevation hB, it is determined that the vehicle is running downhill (see the lower right diagram (2) in FIG. 6). An operation of the traveling direction signal Rev is explained here. When the traveling direction signal Rev is switched from an "OFF" signal to an "ON" signal, the elevation h at the target point is referred to by using the distance information Dis as an argument, and when the vehicle approaches the target point, the traveling direction signal Rev in an "OFF" state is output.

That is, in the elevation MAP 5b1, the start point and the target point are switched with each other according to the traveling direction signal Rev output from the traveling-direction determination unit 5a, and thus the same elevation MAP 5b1 can be used for up and down lines. Therefore, according to the control device of the present embodiment, it is not required to use different elevation MAPs (MAP information) for up and down lines.

The description refers back to FIG. 5 and explanations of the operation are continued. As described above, the energy computing device 5b2 calculates the target charge/discharge amount SOC_ref on the basis of the elevation h obtained from the elevation MAP 5b1. The energy computing device 5b2 uses the elevations h at the start point and the target point to calculate position energy H. When the calculation is made, for example, the following equation can be used.

$$H = mg\Delta h \quad (1)$$

In the above equation, H denotes position energy, m denotes a vehicle's weight with a full passenger load, and Δh denotes the elevation difference between the start point and the target point. When it is assumed that the point A in FIG. 6 is the start point and the point B is the target point, the position energy H becomes mgΔhB. It is obvious that the relative distance can be measured by using a device that can detect the relative distance between the start point and the target point, and the position energy H can be calculated by using the relative distance as Δh.

Next, the energy computing device 5b2 calculates the target charge/discharge amount SOC_ref on the basis of the position energy H. When the calculation is made, for example, the following equation can be used.

$$SOC\_ref = (H/Bat\_Cup) \times 100 \quad (2)$$

In the above equation, Bat Cup expresses the battery capacity of a battery mounted on a hybrid vehicle.

For example, when the target charge/discharge amount SOC ref is considered in the example shown in FIG. 6, in the case of (1) traveling from the point A to the point B, the vehicle runs "uphill", and the sign of the target charge/discharge amount SOC_ref becomes positive (it is assumed that the charging side is "positive" and the discharging side is "negative"), and charging of the battery 2a is required. In contrast, in the case of (2) traveling from the point B to the point A, the vehicle runs "downhill", the sign of the target charge/discharge amount SOC_ref becomes negative, and discharging of the battery 2a is required.

As explained above, the energy estimation unit 5b can estimate the target charge/discharge amount SOC_ref required until the target point is reached, and the power-generation command-value generation unit 5c, which will be described later, charges or discharges the battery 2a, thereby enabling the suppression of the state of charge SOC of the battery 2a becoming over-charged or over-discharged while the vehicle is running.

The description refers back to FIG. 5. The power-generation command-value generation unit 5c generates and outputs the generated-power command value Pc_ref and the engine-output command value Pe_ref by using the target charge/discharge amount SOC_ref calculated by the energy estimation unit 5b, the power-generator rotation speed ωc input from outside the high-order control unit 5, and the state of charge SOC of the battery 2a.

Figure 7:
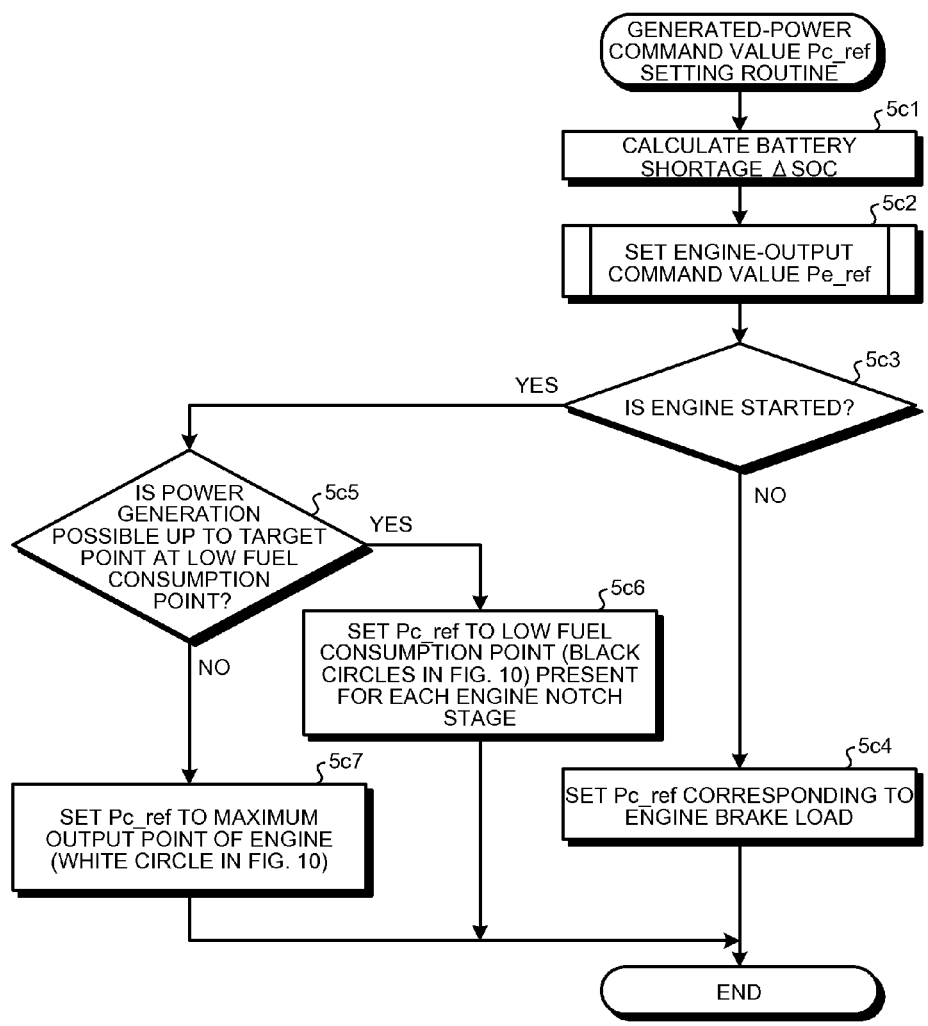
FIG. 7 is a flowchart related to setting of a generated-power command value Pc_ref.
Figure 8:
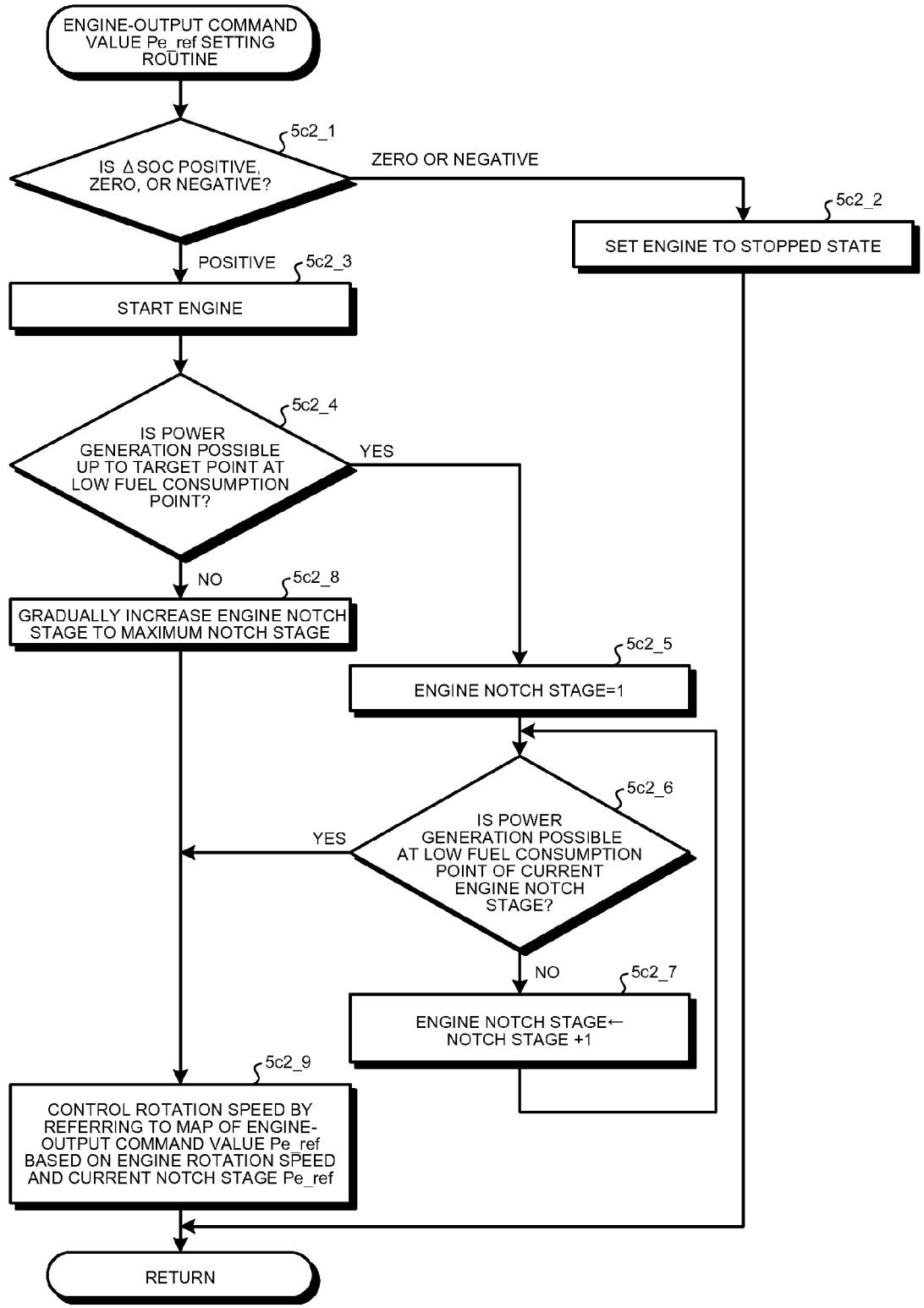
FIG. 8 is a flowchart related to setting of an engine-output command value Pe_ref.
Figure 9:
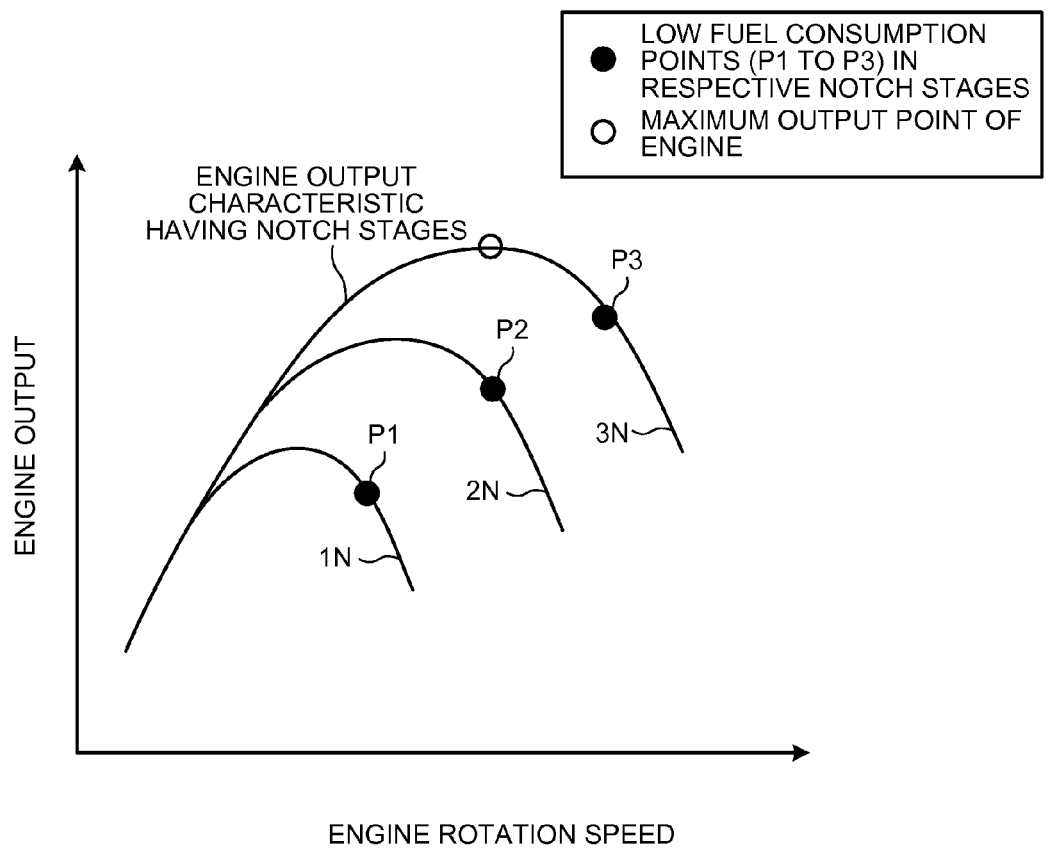
FIG. 9 is a diagram showing an engine output characteristic MAP according to the first embodiment.
Figures 10, 11:
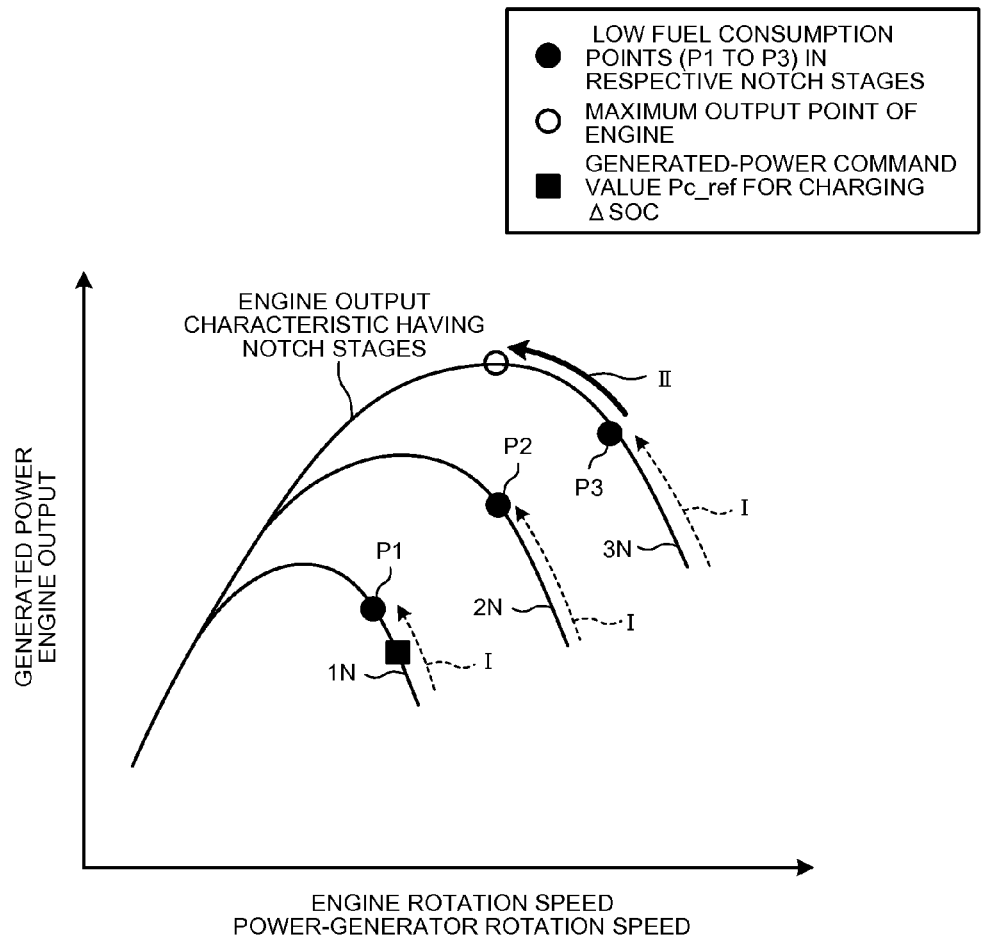
FIG. 10 is a diagram in which a generated power characteristic MAP is superimposed on an engine output characteristic MAP in FIG. 9.
FIG. 11 is a diagram showing a comparison between a database of Patent Literature 1 and a database used when determining a target charge/discharge amount.

The calculation process of the generated-power command value Pc_ref and the engine-output command value Pe_ref generated by the power-generation command-value generation unit 5c is explained here with reference to the drawings in FIGS. 7 to 10. FIG. 7 is a flowchart related to the setting of the generated-power command value Pc_ref. FIG. 8 is a flowchart related to the setting of the engine-output command value Pe ref. FIG. 8 is also a subroutine invoked from the flowchart of FIG. 7. FIG. 9 is a diagram showing an engine output characteristic MAP according to the first embodiment. FIG. 10 is a diagram in which a generated power characteristic MAP is superimposed on the engine output characteristic MAP in FIG. 9.

FIG. 9 shows the engine output characteristic MAP, in which the engine rotation speed is plotted on the horizontal axis and the engine output is plotted on the vertical axis. The engine 1a has notch stages, and for example, a notch 1 to a notch 3 are set. As the number of notch stages increases, the shaft output that is output from the engine 1a increases, and the power supplied to the battery 2a can be adjusted by switching the notch stage appropriately.

Furthermore, P1 to P3 shown by black circles in FIG. 9 are points at which fuel consumption of the engine 1a set for each notch stage of the engine 1a is small. The low fuel consumption points (P1 to P3) are different for each type of engine, and are stored beforehand in the engine output characteristic MAP. Furthermore, in the engine output characteristic MAP, the maximum output point of the engine (shown by a white circle) in the maximum notch stage (in the example, a notch stage 3N) is also stored.

The high-order control unit 5 controls the speed of the engine 1a such that it operates at the low fuel consumption point (P1 to P3) of each notch stage on the basis of the engine output characteristic MAP set as described above. However, if an inclination when running "uphill" is steep and the target charge/discharge amount SOC_ref is too large, the maximum output point of the engine (the point shown by the white circle) is used.

An example of a method of applying the generated-power command value Pc_ref is explained next with reference to FIG. 10. In FIG. 10, an output value is superimposed and displayed on the engine output characteristic MAP in FIG. 9, in which the power-generator rotation speed (in the case of a series hybrid, it is the same as "engine rotation speed") is plotted on the horizontal axis and the power output is plotted on the vertical axis. When the generated-power command value Pc_ref is applied to the power-generation control unit 1e (see FIG. 1), in the engine output characteristic MAP in FIG. 9, the engine output moves on the engine output characteristics for each notch stage, and desired generated power can be generated from the converter 1d, thereby enabling the battery 2a to be charged.

The flow of processes when the generated-power command value Pc_ref and the engine-output command value Pe_ref are generated is explained next with reference to the flowcharts of FIGS. 7 and 8.

First, in FIG. 7, at Step 5c1, a battery shortage ΔSOC is calculated by subtracting the state of charge SOC of the battery 2a when the target charge/discharge amount SOC_ref is calculated from the target charge/discharge amount SOC_ref. For example, in FIG. 6, when it is assumed that the point A is the start point and the point B is the target point, if the target charge/discharge amount SOC_ref is 50[%] and the state of charge SOC when the target charge/discharge amount SOC_ref is calculated is 30[%], the battery shortage ΔSOC becomes 20[%]. At Step 5c2, the flowchart shown in FIG. 8 for setting the engine-output command value Pe_ref is invoked.

In FIG. 8, at Step 5c2_1, it is determined whether to perform the process at Step 5c2_2 or at Step 5c2_3 on the basis of the value of the battery shortage ΔSOC calculated at Step 5c1. Specifically, if the battery shortage ΔSOC is "0" or "negative", control shifts to Step S5c2_2, and if the battery shortage ΔSOC is "positive", control shifts to Step S5c2_3.

At Step 5c2_2, the engine 1a is set to a stopped state. At Step 5c2_3, the engine 1a is started, and whether the engine rotation speed has reached the idling rotation speed is checked.

At Step 5c2_4, when the vehicle runs to the target point by starting the engine 1a, it is determined whether power generation is possible at the low fuel consumption points (P1 to P3: see FIGS. 9 and 10). Specifically, if the engine 1a can be driven up to the target point at the low fuel consumption point (P3) of the maximum notch stage (YES at Step 5c2_4), control shifts to Step 5c2_5. If the state of charge SOC of the battery 2a is likely to be insufficient even if power is generated at the low fuel consumption point (P3) at the maximum notch stage, i.e., if the battery shortage ΔSOC is unlikely to be overcome by the generated power at the low fuel consumption point (P3) of the maximum notch stage before the target point is reached (NO at Step 5c2_4), control shifts to Step 5c2_8.

At Step 5c2_5, the engine notch stage is set to "1", and it is checked whether the engine 1a achieves the rotation speed corresponding to one notch. At Step 5c2_6, it is determined whether power generation is possible at the low fuel consumption point (any of P1 to P3: see FIGS. 9 and 10) of the current engine notch stage. If power generation is possible at the low fuel consumption point (P1 to P3) of the current engine notch stage (YES at Step 5c26), control shifts to Step 5c2_9. In contrast, if the state of charge SOC of the battery 2a is likely to be insufficient even if power generation is performed at the low fuel consumption point (P1 to P3) of the current engine notch stage, i.e., if the battery shortage ΔSOC is unlikely to be overcome by the generated power at the low fuel consumption point (P1 to P3) of the current notch stage (NO at Step 5c2_6), control shifts to Step 5c2_7 in order to control such that the engine notch stage is increased by one notch (1N→2N→3N), and thereafter, the processes at Steps 5c2_6 and 5c2_7 are repeated according to the determination process at Step 5c2_6.

At Step 5c2_8, the engine notch stage is gradually increased such that the engine 1a reaches the maximum notch stage (3N). The timing of the gradual increase is such that a time interval is provided when switching between notch stages, and for example, switching of 1N→2N→3N is performed every 2 seconds.

At Step 5c2_9, according to the engine output characteristic MAP in FIG. 9, the desired engine-output command value Pe_ref is output to the engine control unit 1b on the basis of the current engine notch stage and the engine rotation speed. Specifically, in the process at Step 5c2_9 after Yes is determined at Step 5c2_6, the engine rotation speed is controlled by using the engine output characteristic MAP in FIG. 9 such that the engine shaft output matched with the battery shortage ΔSOC calculated at Step 5c1 becomes the low fuel consumption point (any of P1 to P3), and the engine-output command value Pe ref is output to the engine control unit 1b. Meanwhile, in the process at Step 5c2_9 in the case of shifting from Step 5c2_8, the engine rotation speed is controlled so as to be at the maximum output point of the engine (the point shown by the white circle) on the engine output characteristic MAP in FIG. 9, and the engine-output command value Pe_ref corresponding to the engine rotation speed is output to the engine control unit 1b.

The description refers back to FIG. 7. It is determined at Step 5c3 whether the engine 1a has been started. If the engine 1a is in a stopped state (NO at Step 5c3), control shifts to Step 5c4, where the generated-power command value Pc_ref corresponding to the engine brake force is output to the power-generation control unit 1e. According to the operation, when the target charge/discharge amount SOC_ref is calculated, surplus power charged to the battery 2a is consumed by the rotation load of the engine 1a. Therefore, according to the control, the state of charge SOC of the battery 2a can be reduced, and the battery 2a can be prevented from being over-charged before the target point is reached.

In contrast, if the engine 1a is in a driven state (YES at Step 5c3), control shifts to Step 5c5. At Step 5c5, when the vehicle is to run to the target point, it is determined whether power generation is possible at the low fuel consumption point (P1 to P3: see FIGS. 9 and 10). Specifically, if the engine 1a can be driven to the target point at the low fuel consumption point (P3) of the maximum notch stage (YES at Step 5c5), control shifts to Step 5c6. If the state of charge SOC of the battery 2a is likely to be insufficient even if power is generated at the low fuel consumption point (P3) of the maximum notch stage, i.e., when the battery shortage ΔSOC is unlikely to be overcome by the generated power at the low fuel consumption point (P3) of the maximum notch stage before the target point is reached (NO at Step 5c5), control shifts to Step 5c7.

At Step 5c6, the engine rotation speed is controlled on the basis of the generated power characteristic MAP in FIG. 10 such that power is generated at the low fuel consumption point (any of P1 to P3 shown by the black circles in FIG. 10) of the corresponding engine notch stage, and the generated-power command value Pc_ref corresponding to the power-generator rotation speed is output to the power-generation control unit 1e.

In contrast, at Step 5c7, the engine rotation speed is controlled on the basis of the generated power characteristic MAP in FIG. 10 such that power is generated at the maximum output point (the point shown by the white circle in FIG. 10) of the engine 1a, and the generated-power command value Pc_ref corresponding to the power-generator rotation speed is output to the power-generation control unit 1e.

The method of applying the generated-power command value Pc_ref according to the first embodiment is summarized as follows.

(Control of Route I)

When it is assumed that an operating point on the generated power characteristic MAP is, for example, at the point shown by a black square as shown in FIG. 10, control is executed such that the operating point gradually moves to the low fuel consumption point (P1) of the engine 1a. When the operating point is on 2N and 3N, control is executed such that the operating point gradually moves to the low fuel consumption points (P2 and P3) of the engine 1a. When the generated-power command value Pc_ref is applied, application can be performed gradually every given time interval, or can be performed with a temporary delay. By executing such control, the operating point can be matched with the low fuel consumption points (P1 to P3) of the engine 1a, while performing a power generation operation without causing engine stall.

(Control of Route II)

If the value of the battery shortage ΔSOC is too high and power generation higher than that at the low fuel consumption point (P3) of the maximum notch stage is required, the generated-power command value Pc_ref is further increased and applied such that the operating point becomes the maximum output point of the engine 1a shown by the white circle.

On the basis of the above explanations, with reference to FIG. 11, the effects of the present invention are summarized in comparison to Patent Literature 1. FIG. 11 is a diagram showing a comparison between the database of Patent Literature 1 and the database used when determining the target charge/discharge amount SOC_ref according to the present invention. In FIG. 11, when a comparison is made between the used databases, only the elevation database is used in the present invention, whereas the operating mode database and the position/reference charge amount database are used in Patent Literature 1. Further, when the number of pieces of MAP data required for one line is compared, in the present invention, one piece of data is used because a common database is used for the up and down lines. In contrast, two pieces of data are required in the Patent Literature 1 because different databases are used for the up and down lines. Accordingly, the following effects can be obtained by the function of the high-order control unit 5 according to the first embodiment.

In the control device according to the first embodiment, the high-order control unit 5 can determine the power generation amount (the generated-power command value Pc_ref) only by the traveling direction signal Rev and the simple elevation MAP, which is used in common for both the up and down lines, without sequentially updating the charge/discharge schedule according to the operating mode database and storing the data thereof in a memory capacity, as described in Patent Literature 1 described above. Accordingly, the memory capacity of the high-order control unit 5 is not completely occupied, thereby enabling the memory capacity to be saved.

It is obvious that the effects described above can be obtained even if there are a plurality of engines 1a or batteries 2a in a vehicle formation.

As explained above, according to the control device of the first embodiment, the high-order control unit 5 includes the elevation MAP, which is used in common for both the up and down lines and in which at least two predetermined elevation values on the running track are described, and controls the power generation device 1 by calculating the amount of charge and discharge with respect to the power storage device 2, on the basis of the traveling direction signal Rev expressing the traveling direction of the vehicle, the running distance information from the distance translation unit 3h, and the information on the elevation MAP. Therefore, there are effects such that the amount of information on the database can be reduced more than that in Patent Literature 1 when performing charge and discharge control on the power storage device 2, and the memory capacity in which the vehicle database is stored can be reduced.

Second Embodiment

Figure 12:
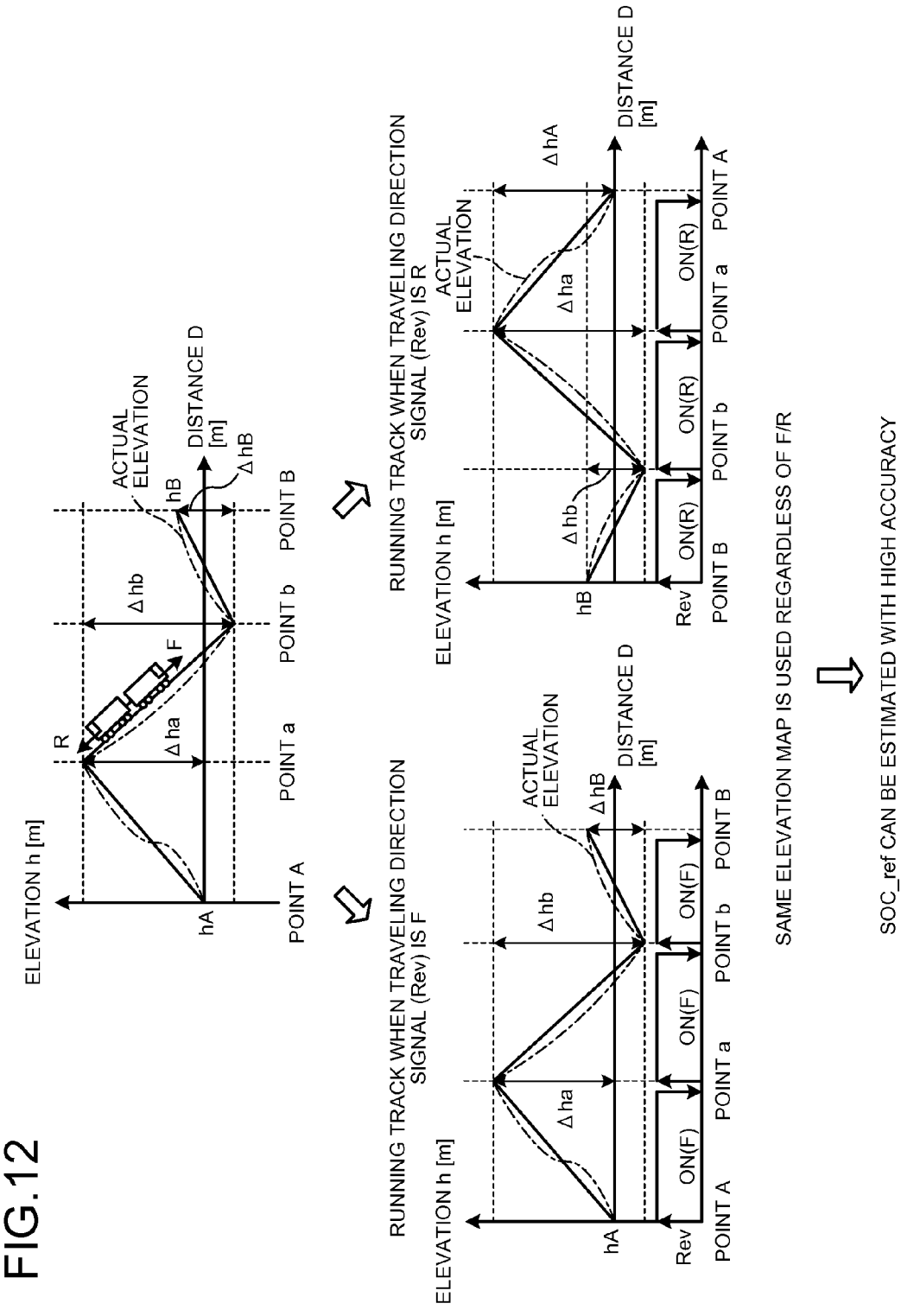
FIG. 12 is a diagram showing the concept of an elevation MAP according to a second embodiment of an energy estimation unit.

A control device according to a second embodiment is explained next. FIG. 12 is a diagram showing the concept of the elevation MAP 5b1 according to the second embodiment of the energy estimation unit 5b. In FIG. 12, a case when the traveling direction signal Rev is "F" or "R" with respect to the distance D (horizontal axis) is designated as an "ON" state, and the rise and fall of the traveling direction signal Rev are shown together. In the second embodiment, the settings of the elevation MAP are different from those of the elevation MAP 5b1 of the first embodiment.

The elevation MAP 5b1 in FIG. 12 is an elevation MAP in which a high altitude point (point a) and a low altitude point (point b) are present in a line between the point A and the point B. For example, this elevation MAP is used when there is a point of inflection such as when there is a mountain at the point a and there is a valley at the point b.

As compared to the elevation MAP (FIG. 6) of the first embodiment, in FIG. 12, the elevation difference Δh between the start point and the target point is different when the traveling direction signal Rev is "F" and "R". Therefore, the value of SOC_ref estimated by the energy estimation unit 5b in the high-order control unit 5 is also different. Specifically, when the elevation difference Δha at the point a when the traveling direction signal Rev is "F" is compared to the elevation difference Δha at the point a when the traveling direction signal Rev is "R", the elevation difference Δha in the former case is an elevation difference based on the point A that is the start point; however, the elevation difference Δha in the latter case is an elevation difference based on the point b that is a low altitude point. Therefore, the values in both cases are different. Accordingly, as the engine-output command value Pe_ref and the generated-power command value Pc_ref output the power-generation command-value generation unit 5c of the high-order control unit 5, different command values are generated with respect to the traveling direction signal Rev. Immediately before reaching the target point, a predetermined point ahead in the traveling direction of the vehicle is set as a new target point to generate a new command value. By repeating this process, running control between the point A and the point B is executed. It is obvious that, because the vehicle obtains the distance information Dis on the vehicle from the distance translation unit 3h at all times, the target point can be arbitrarily switched by referring to the elevation MAP 5b1 in FIG. 12. In this case, a point in time where the new traveling direction signal Rev is input (when the traveling direction signal Rev becomes an "ON" state) is set as the start point. For example, as the traveling direction signal Rev of the second embodiment, the high altitude point (the point a) and the low altitude point (the point b) are present between the start point and the target point; therefore, an "ON" signal is output three times including at the start point and an "OFF" signal is output three times near the target point. With this method, the charge and discharge control with respect to the power storage device 2 can be executed at a preferable timing.

By using the function of the elevation MAP 5b1 of the second embodiment, at least one of the high altitude point (the point a) and the low altitude point (the point b) is set as the target point before reaching the target point (the point B). Therefore, there is an effect such that the target charge/discharge amount SOC_ref of the battery 2a while running can be estimated more accurately than the target charge/discharge amount SOC_ref of the first embodiment.

Third Embodiment

Figure 13:
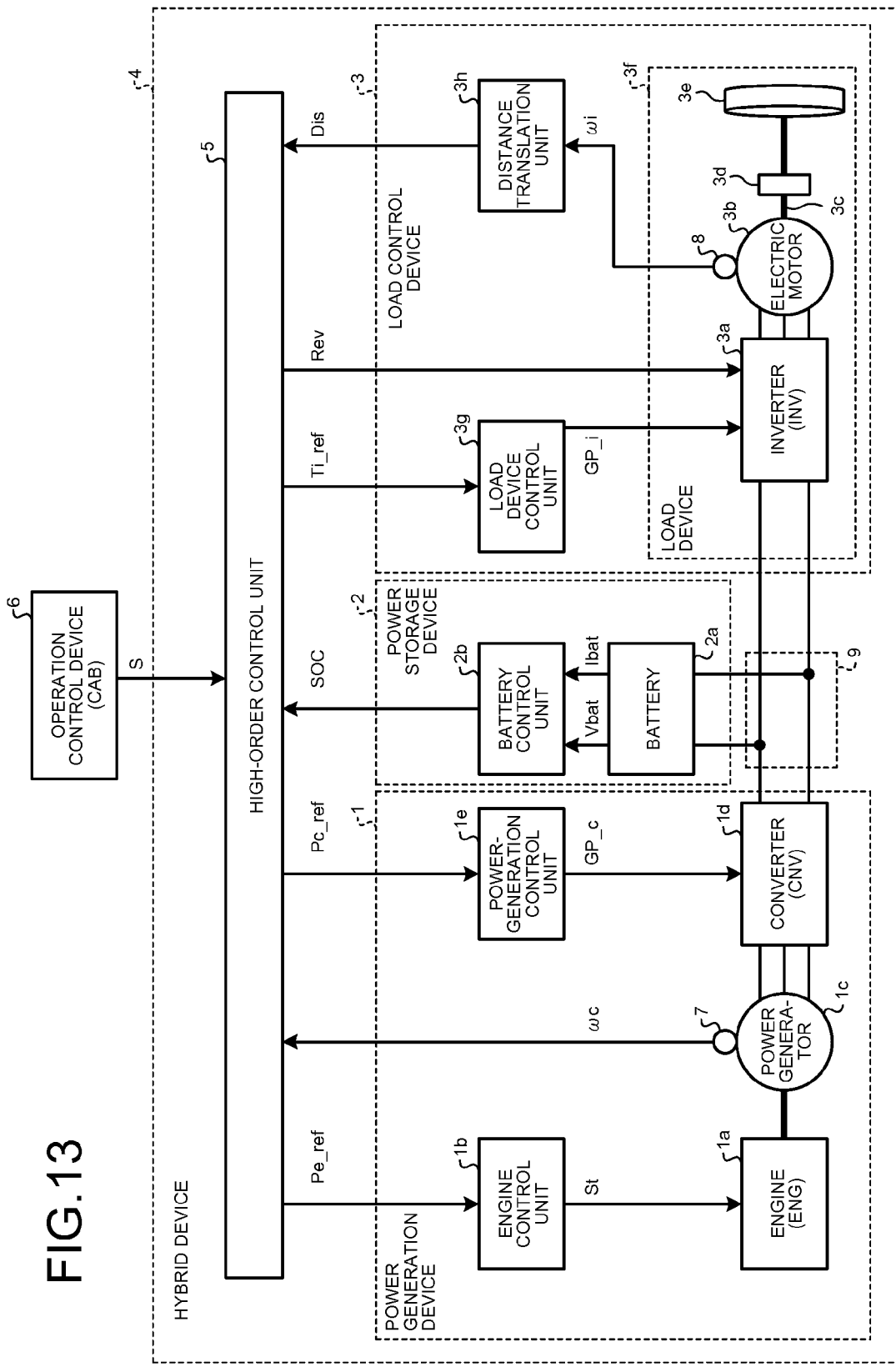
FIG. 13 is a diagram showing a configuration example of a hybrid vehicle drive system including a control device according to a third embodiment.

A control device according to a third embodiment is explained next. FIG. 13 is a diagram showing a configuration example of a hybrid vehicle drive system including the control device according to the third embodiment. The third embodiment is different from the first embodiment in that the high-order control unit 5 according to the first embodiment is installed in the hybrid device 4.

With the hybrid device 4 according to the third embodiment, the high-order control unit 5 is installed in the hybrid device 4. Therefore, as compared to the hybrid device 4 according to the first embodiment, the length of the signal lines connecting the high-order control unit 5 to the power generation device 1, the power storage device 2, and the load control device 3 can be reduced. Thus, an effect is obtained where the cost of installing the signal lines can be reduced.

Fourth Embodiment

Figure 14:
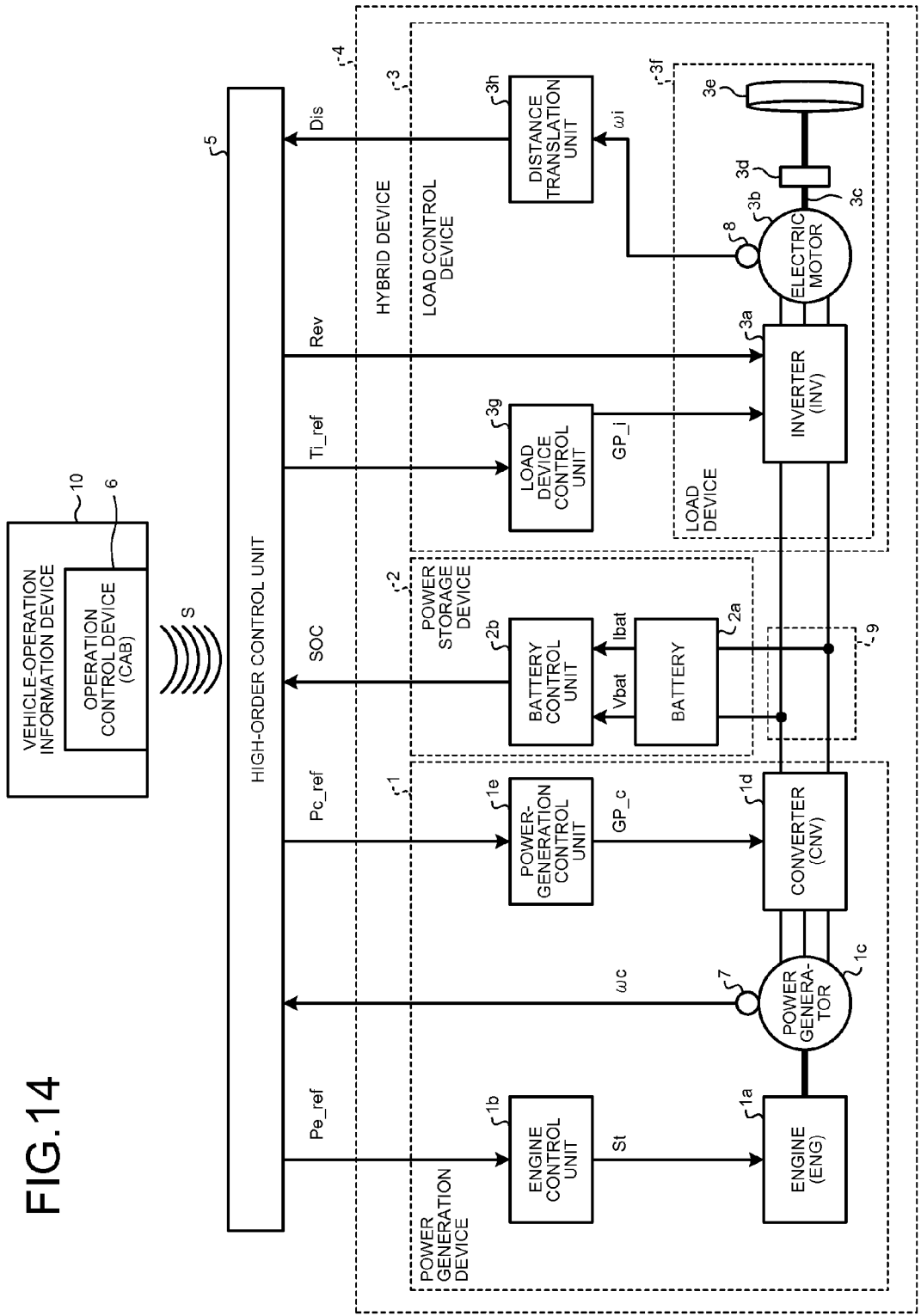
FIG. 14 is a diagram showing a configuration example of a hybrid vehicle drive system including a control device according to a fourth embodiment.
Figure 15:
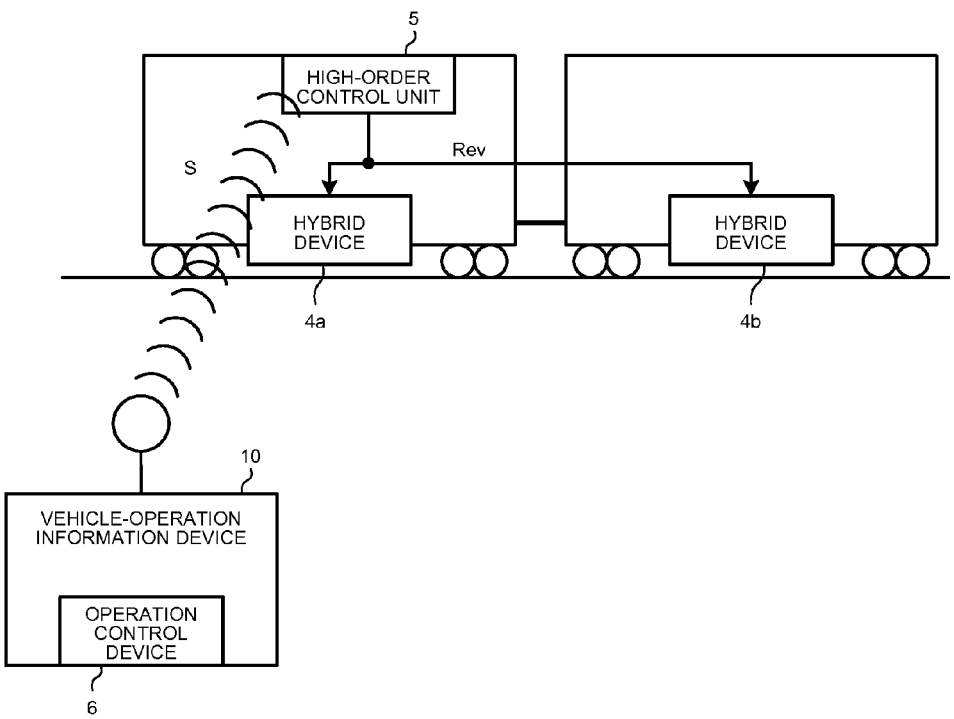
FIG. 15 is a diagram showing a configuration example when the control device according to the fourth embodiment is mounted on a vehicle.
Figure 16:
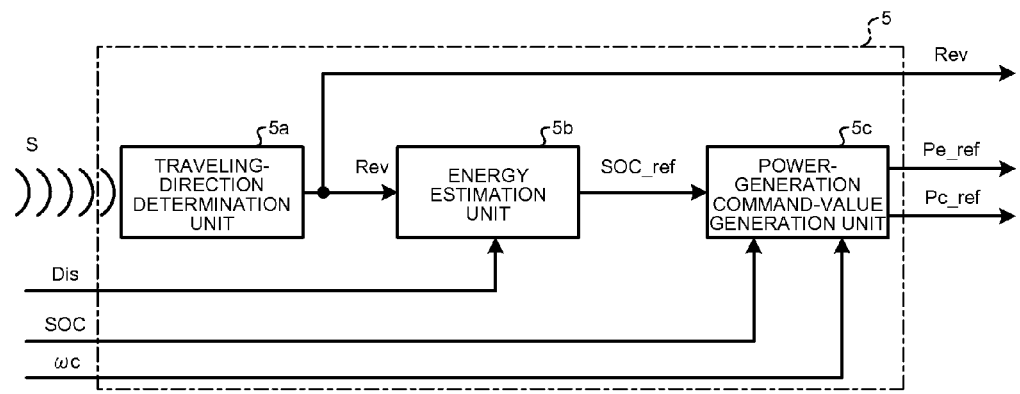
FIG. 16 is a block diagram showing a configuration example of a high-order control unit constituting relevant parts of the control device according to the fourth embodiment.

A control device according to a fourth embodiment is explained next with reference to FIGS. 14 to 16. FIG. 14 is a diagram showing a configuration example of a hybrid vehicle drive system including the control device for a hybrid vehicle according to the fourth embodiment. FIG. 15 is a diagram showing a configuration example when the control device according to the fourth embodiment is mounted on a vehicle. FIG. 16 is a block diagram showing a configuration example of the high-order control unit 5 constituting relevant parts of the control device according to the fourth embodiment. The fourth embodiment is different from the first embodiment in that the operation control device 6 according to the first embodiment is installed in a vehicle-operation information device 10 and in that the vehicle-operation information device 10 transfers information to the high-order control unit 5 by a radio signal.

The vehicle-operation information device 10 is a device that is installed on the ground and has a function of monitoring the operation state of the vehicle. The vehicle-operation information device 10 is also a device that detects disruptions of train operation diagrams of the vehicles running on the track and sends an instruction to the vehicle so as to resolve any disruption.

The vehicle-operation information device 10 manages train operation diagrams. Therefore, the vehicle-operation information device 10 can transmit the vehicle-direction switching signal S by radio to the high-order control unit 5 mounted on an individual vehicle (see FIGS. 14 and 15). When the vehicle-direction switching signal S from the vehicle-operation information device 10 is detected, the high-order control unit 5 outputs the traveling direction signal Rev to the hybrid devices 4a and 4b under the floor of the vehicle. The traveling direction signal Rev is also used in the high-order control unit 5 and is used by the energy estimation unit 5b in the high-order control unit 5 constituted as shown in FIG. 2. In FIG. 16, the respective functions of the traveling-direction determination unit 5a, the energy estimation unit 5b, and the power-generation command-value generation unit 5c constituting the high-order control unit 5 are identical or equivalent to those of the first embodiment, except that the traveling-direction determination unit 5a has a function of receiving the vehicle-direction switching signal S transmitted by radio.

With the hybrid vehicle drive system according to the fourth embodiment configured as described above, there is an effect such that, because the operation control device 6 is not mounted on the vehicle, the vehicle's mass m can be reduced. Further, because the vehicle's mass m is reduced, the position energy H is also reduced, thereby leading to a reduction of the target charge/discharge amount SOC_ref. As a result, there is an effect such that variations in the state of charge SOC of the battery 2a can be suppressed.

Fifth Embodiment

Figure 17:
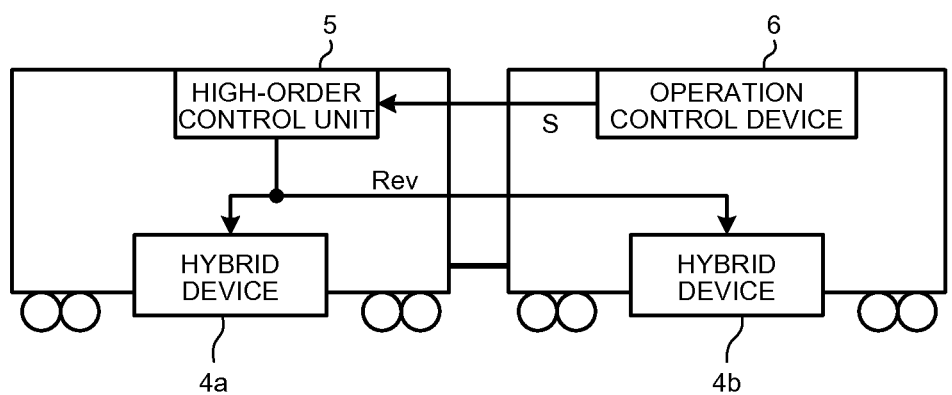
FIG. 17 is a diagram showing a configuration example when a control device according to a fifth embodiment is mounted on a vehicle.

A control device according to a fifth embodiment is explained next. FIG. 17 is a diagram showing a configuration example when the control device according to the fifth embodiment is mounted on a vehicle. As shown in FIG. 17, the configuration is such that the vehicle-direction switching signal S from the operation control device 6 is input to the high-order control unit 5. In the fifth embodiment, the internal configuration of the operation control device 6 is different from that of the first embodiment. Specifically, the fifth embodiment assumes a case where the operation control device 6 does not include a cab, i.e., there is no cab and the driver does not output the vehicle-direction switching signal S.

Upon detection of the vehicle-direction switching signal S, the high-order control unit 5 generates the traveling direction signal Rev and outputs the traveling direction signal Rev to the hybrid devices 4a and 4b under the floor of the vehicle. In the operation control device 6 according to the fifth embodiment, because the vehicle-direction switching signal S is stored according to the train operation diagrams for the vehicle in which the operation control device 6 is installed, the stored vehicle-direction switching signal S is transmitted to the high-order control unit 5. Other functions are identical to those of the first to fourth embodiments. That is, according to the control device of the fifth embodiment, the configuration in which the vehicle-direction switching signal S from the operation control device 6 that does not include a cab is input to the high-order control unit 5 can be applied to the configurations of the first to fourth embodiments.

With the hybrid vehicle drive system of the fifth embodiment configured as described above, because the operation control device 6 does not include a cab, there is an effect such that an erroneous operation by a driver (what is called "human error") can be prevented.

Sixth Embodiment

Figure 18:
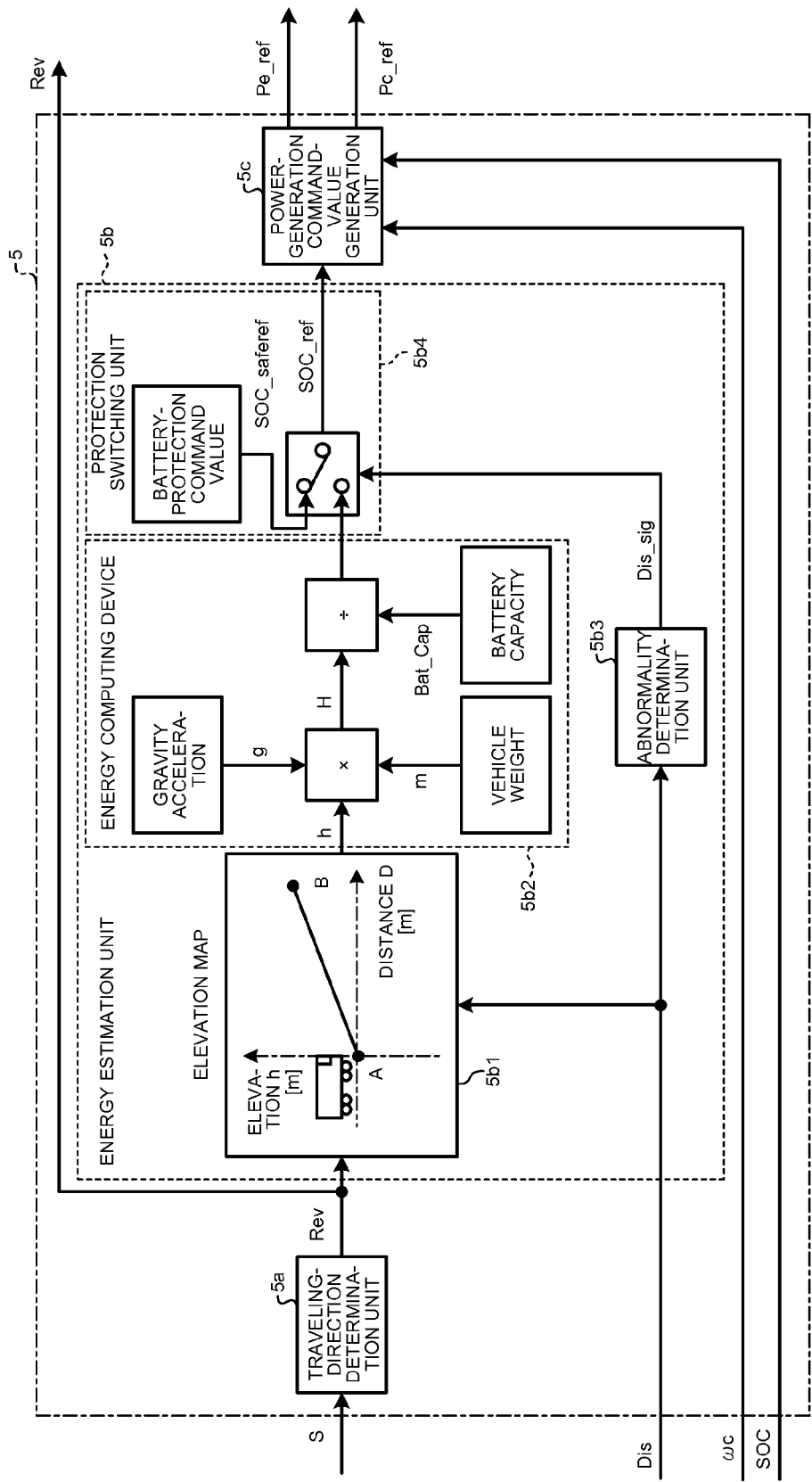
FIG. 18 is a diagram showing a configuration example of a high-order control unit constituting relevant parts of a control device according to a sixth embodiment.

A control device according to a sixth embodiment is explained next with reference to FIG. 18. FIG. 18 is a block diagram showing the high-order control unit 5 of the control device according to the sixth embodiment in detail. In FIG. 18, the configuration of the energy estimation unit 5b in the high-order control unit 5 (FIG. 5) is different from that of the first embodiment. Specifically, in the sixth embodiment, the energy estimation unit 5b is additionally provided with an abnormality determination unit 5b3 and a protection switching unit 5b4 and a case is assumed where the second speed sensor 8 has an abnormality.

With the configuration described above, when it is detected that the second speed sensor 8 is in an abnormal state and the distance information Dis from the distance translation unit 3h is not normal, the abnormality determination unit 5b3 transmits an "ON" signal as a speed-sensor abnormal signal Dis_sig to the protection switching unit 5b4. Upon transmission of the "ON" signal as the speed-sensor abnormal signal Dis_sig from the abnormality determination unit 5b3, the protection switching unit 5b4 switches from the target charge/discharge amount SOC_ref to a battery-protection command value SOC_saferef. The battery-protection command value SOC_saferef can be set within a range in which the battery 2a is not over-charged or over-discharged and, for example, is set to 50[%].

With the hybrid vehicle drive system of the sixth embodiment configured as described above, there is an effect such that, even if the distance information Dis cannot be obtained and elevation at the target point cannot be obtained from the elevation MAP 5b1, the target charge/discharge amount SOC_ref can be generated.

The configurations described in the above first to sixth embodiments are only examples of the configuration of the present invention. The configurations can be combined with other well-known techniques, and it is obvious that the present invention can be modified, for example, by omitting a part thereof without departing from the scope of the invention.

INDUSTRIAL APPLICABILITY

As described above, the present invention is useful as a control device for a hybrid vehicle that can achieve reduction of the memory capacity.

REFERENCE SIGNS LIST 1 power generation device, 1a engine, 1b engine control unit, 1c power generator, 1d converter, 1e power-generation control unit, 2 power storage device, 2a battery, 2b battery control unit, 3 load control device, 3a inverter, 3b electric motor, 3c axle, 3d speed reducer, 3e drive wheel, 3f load device, 3g load-device control unit, 3h distance translation unit, 4, 4a, 4b hybrid device, 5 high-order control unit, 5a traveling-direction determination unit, 5b energy estimation unit, 5b1 elevation MAP, 5b2 energy computing device, 5b3 abnormality determination unit, 5b4 protection switching unit, 5c power-generation command-value generation unit, 6, 6a, 6b operation control device, 7 first speed sensor, 8 second speed sensor, 9 DC link unit, 10 vehicle-operation information device.

The invention claimed is:

1. A controller for a hybrid railroad vehicle that is applied to a hybrid railroad vehicle drive system including a power storage, a power generator that is electrically connected to the power storage, and a load that drives a vehicle by using power from the power storage and the power generator, wherein the controller comprises a high-order controller that controls charge and discharge with respect to the power storage through the power generator, wherein
  the high-order controller includes a traveling-direction generator that generates a traveling direction signal expressing a traveling direction (forward/reverse) of a vehicle,
  the traveling-direction generator generates the traveling direction signal by using a vehicle-direction switching signal generated when a traveling direction of a vehicle is switched, and
  the high-order controller controls the power generator by calculating an amount of charge/discharge with respect to the power storage, on a basis of the traveling direction signal output every time a target point is reached.

2. The controller for a hybrid railroad vehicle according to claim 1, wherein the traveling-direction generator is provided to a cab and is based on a signal for specifying forward/reverse of a vehicle operated by a driver.

3. The controller for a hybrid railroad vehicle according to claim 1, wherein the traveling-direction generator generates the traveling direction signal by using information which is obtained from signal information from an operation controller installed in a vehicle.

4. The controller for a hybrid railroad vehicle according to claim 1, wherein the traveling-direction generator generates the traveling direction signal by using information which is obtained from radio signal information from an operation controller installed outside a vehicle.

5. The controller for a hybrid railroad vehicle according to claim 1, wherein the high-order controller is provided in a vehicle that constitutes the hybrid railroad vehicle.

6. The controller for a hybrid railroad vehicle according to claim 1, wherein
  the power generator includes
    a power generator driven by an engine,
    a converter that converts AC power output from the power generator to DC power,
    an engine controller that controls an operation of the engine, and
    a power-generation controller that controls an operation of the converter.

7. The controller for a hybrid railroad vehicle according to claim 1, wherein the high-order controller is provided outside the hybrid railroad vehicle.

8. The controller for a hybrid railroad vehicle according to claim 1, wherein the high-order controller includes a height database that is used in common for up and down lines and in which height information on two points including at least any of the highest altitude point and a lower altitude point on a running track is described, and controls the power generator by calculating an amount of charge/discharge with respect to the power storage, on a basis of running distance information, and information on the height database.

9. The controller for a hybrid railroad vehicle according to claim 8, wherein the height database sets a point in time where the traveling direction signal is input as a reference point.

10. The controller for a hybrid railroad vehicle according to claim 8, wherein the height database sets a final point of a running track as a target point.

11. The controller for a hybrid railroad vehicle according to claim 8, wherein
  the high-order controller includes
    an energy estimator that sets a target charge/discharge amount at a target point on a basis of the traveling direction signal, the running distance information, and the information on the height database, and a power-generation command-value generator that determines a charge/discharge amount of the power storage device on a basis of the target charge/discharge amount and a state of charge of the power storage.

12. The controller for a hybrid railroad vehicle according to claim 9, wherein the energy estimator calculates the target charge/discharge amount when the traveling direction signal is input.

13. The controller for a hybrid railroad vehicle according to claim 9, wherein the energy estimator calculates position energy from height data obtained from the height database and calculates the target charge/discharge amount on a basis of the position energy.

14. The controller for a hybrid railroad vehicle according to claim 9, wherein the power-generation command-value generator calculates charge-discharge amount difference information by using the target charge/discharge amount and a state of charge of the power storage when the traveling direction signal is input and determines an output command to an engine and a power generation command to a converter on a basis of the charge-discharge amount difference information.

15. The controller for a hybrid railroad vehicle according to claim 9, wherein the energy estimator includes an abnormality detector that detects an abnormal state of the running distance information, and a protection switch that switches a target charge/discharge amount to a battery-protection charge/discharge amount command value set within a range in which a battery is not over-charged or over-discharged, on a basis of a determination result from the abnormality detector.

* * * * *